United States Patent
Mineda

(10) Patent No.: US 10,296,316 B2
(45) Date of Patent: May 21, 2019

(54) PARALLELIZATION METHOD, PARALLELIZATION TOOL, AND IN-VEHICLE APPARATUS

(71) Applicant: DENSO CORPORATION, Kariya, Aichi-pref. (JP)

(72) Inventor: Kenichi Mineda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/350,368

(22) Filed: Nov. 14, 2016

(65) Prior Publication Data

US 2017/0168790 A1 Jun. 15, 2017

(30) Foreign Application Priority Data

Dec. 10, 2015 (JP) .................. 2015-241504

(51) Int. Cl.
*G06F 8/41* (2018.01)

(52) U.S. Cl.
CPC .................... *G06F 8/456* (2013.01)

(58) Field of Classification Search
CPC ...................................... G06F 8/456
USPC ......................................... 717/149
See application file for complete search history.

(56) References Cited

U.S. PATENT DOCUMENTS

| | | | |
|---|---|---|---|
| 9,489,180 B1* | 11/2016 | Baskaran | G06F 8/447 |
| 9,727,377 B2* | 8/2017 | Martinez Canedo | G06F 9/4881 |
| 2002/0066005 A1* | 5/2002 | Shibayama | G06F 9/3834 712/218 |
| 2004/0103410 A1* | 5/2004 | Sakai | G06F 8/456 717/146 |
| 2004/0172626 A1* | 9/2004 | Jalan | G06F 8/456 717/149 |
| 2008/0162889 A1* | 7/2008 | Cascaval | G06F 9/3834 712/216 |
| 2008/0250232 A1* | 10/2008 | Nakashima | G06F 9/3808 712/225 |
| 2009/0055630 A1* | 2/2009 | Isshiki | G06F 8/456 712/216 |
| 2009/0138862 A1* | 5/2009 | Tanabe | G06F 8/456 717/149 |
| 2009/0249307 A1* | 10/2009 | Yoshida | G06F 8/75 717/131 |

(Continued)

*Primary Examiner* — Lewis A Bullock, Jr.
*Assistant Examiner* — Theodore E Hebert
(74) *Attorney, Agent, or Firm* — Posz Law Group, PLC

(57) ABSTRACT

A method is for generating a parallel program for a multicore microcomputer from processes in a single program for a single core. The method includes extraction procedure, association procedure, and analysis procedure. The extraction procedure extracts (i) an extracted address of an accessed data item, which is among data items stored in a storage area together with the processes and accessed when each process is executed and (ii) an extracted symbol name of the accessed data item. The association procedure associates an associated address in the storage area storing the accessed data item of the extracted symbol name with the extracted symbol name. The analysis procedure analyzes a dependency between each process based on the extracted address and the associated address, and determines that two processes accessing an identical address have a dependency while determining that two processes not accessing an identical address have no dependency.

18 Claims, 7 Drawing Sheets

(56) References Cited

U.S. PATENT DOCUMENTS

| | | | |
|---|---|---|---|
| 2012/0079467 A1* | 3/2012 | Tojo | G06F 8/452 |
| | | | 717/150 |
| 2012/0167069 A1* | 6/2012 | Lin | G06F 8/456 |
| | | | 717/160 |
| 2013/0024849 A1* | 1/2013 | Baba | G06F 8/433 |
| | | | 717/150 |
| 2013/0326532 A1* | 12/2013 | Fujimaki | G06F 9/50 |
| | | | 718/104 |
| 2014/0096117 A1* | 4/2014 | Tanaka | G06F 8/434 |
| | | | 717/149 |
| 2014/0304491 A1* | 10/2014 | Kasahara | G06F 13/28 |
| | | | 712/42 |
| 2014/0372995 A1* | 12/2014 | Mori | G06F 8/452 |
| | | | 717/146 |
| 2015/0363230 A1* | 12/2015 | Kasahara | G06F 8/456 |
| | | | 718/106 |
| 2016/0085639 A1* | 3/2016 | Abouzour | G06F 11/1471 |
| | | | 707/648 |
| 2016/0147577 A1* | 5/2016 | Artmeier | G06F 8/451 |
| | | | 718/106 |
| 2016/0313991 A1* | 10/2016 | Wei | G06F 8/452 |
| 2017/0109216 A1* | 4/2017 | Mineda | G06F 9/52 |
| 2017/0168790 A1* | 6/2017 | Mineda | G06F 8/456 |
| 2017/0364341 A1* | 12/2017 | Mineda | G06F 8/45 |

* cited by examiner

PARALLELIZATION METHOD, PARALLELIZATION TOOL, AND IN-VEHICLE APPARATUS

CROSS REFERENCE TO RELATED APPLICATION

The present application is based on Japanese Patent Application No. 2015-241504 filed on Dec. 10, 2015, the disclosure of which is incorporated herein by reference.

TECHNICAL FIELD

The present disclosure relates to a parallelization method that generates a parallel program for a multicore microcomputer from a single program for a single core microcomputer, a parallelization tool, and an in-vehicle apparatus that mounts the parallel program generated through the parallelization method.

BACKGROUND ART

Patent Literature 1: JP 2015-001807 A (US 2014/0372995 A1)

An example of a parallelization method that generates a parallel program for a multicore microcomputer from a single program for a single core microcomputer includes a parallelization compile method of Patent Literature 1.

The parallelization compile method generates an intermediate language by lexical analysis and syntactic analysis of a source code of a single program, and uses this intermediate language to analyze and optimize dependencies between multiple macro tasks (hereinafter, processes MT). The parallelization compile method generates a parallel program by scheduling based on an execution time of each process MT and dependencies between processes MT.

SUMMARY

Two processes MT that do not access the same data are considered to have no dependency in the dependency analysis. That is, these two processes MT are executable in parallel.

A procedure of specifying the data accessed when the processes MT are executed includes address specification using an address in a storage area and symbol specification using a symbol name such as a variable name. It is however difficult to determine whether the data indicated by an address and the data indicated by a symbol name are the same. That is, it is difficult to determine whether a process MT using address specification and another process MT using symbol specification access the same data. It is therefore difficult to determine the dependency between the process MT using address specification and the process MT using symbol specification in dependency analysis. An error may therefore arise in the dependency analysis.

In view of the foregoing, an object of the present disclosure is to provide a parallelization method that can create a parallel program while suppressing errors in dependence analysis, a parallelization tool, and an in-vehicle apparatus that can execute the parallel program.

To achieve the above object, according to a first example of the present disclosure, a parallelization method is provided for generating a parallel program parallelized for a multicore microcomputer having a plurality of cores from a plurality of processes in a single program for a single core microcomputer having one core. The parallelization method includes an extraction procedure, an association procedure, and an analysis procedure. The extraction procedure extracts an extracted address and an extracted symbol name. The extracted address is an address of an accessed data item. The accessed symbol name is a symbol name of the accessed data item. The accessed data item is among a plurality of data items that are stored in a storage area together with the plurality of processes and being accessed when each process is executed. The association procedure associates an associated address with the extracted symbol name. The associated address is an address in the storage area that stores the accessed data item of the extracted symbol name. The analysis procedure analyzes a dependency between each process based on subject addresses that are the extracted address and the associated address to determine parallelizable processes from the plurality of processes, and determines that two processes accessing an identical address have a dependency while determining that two processes not accessing an identical address have no dependency.

The first example extracts, within multiple data items accessed when each process is executed, an address of the accessed data item in a storage area when each process is executed and a symbol name of the accessed data item when each process is executed. The first example associates the symbol name with the address in the storage area corresponding to the symbol name. The address in the storage area is thus associated with the data item whose symbol name is specified and accessed when each process is executed.

The first example analyzes dependencies between the respective processes based on the addresses of the data items specified in each process to determine that two processes that access the same data have a dependency and that two processes that do not access the same data have no dependency. The first example can thus analyze dependencies between respective processes based on the addresses. The first example can thus create a parallel program while suppressing errors in the dependence analysis.

Further, according to a second example of the present disclosure, a parallelization tool is provided to include a computer to generate a parallel program parallelized for a multicore microcomputer having a plurality of cores from a plurality of processes in a single program for a single core microcomputer having one core. The parallelization tool includes a symbol and address extractor, a symbol association processor, and a dependency analyzer. The symbol and address extractor extracts an extracted address and an extracted symbol name, the extracted address being an address of an accessed data item, the accessed symbol name being a symbol name of the accessed data item, the accessed data item being among a plurality of data items that are stored in a storage area together with the plurality of processes and being accessed when each process is executed. The symbol association processor associates an associated address with the extracted symbol name, the associated address being an address in the storage area that stores the accessed data item of the extracted symbol name. The dependency analyzer analyzes a dependency between each process based on subject addresses that are the extracted address and the associated address to determine parallelizable processes from the plurality of processes, and determines that two processes accessing an identical address have a dependency while determining that two processes not accessing an identical address have no dependency.

Similar to the above first example, the second example can create a parallel program while suppressing errors in the dependence analysis.

Further, according to a third example of the present disclosure, an in-vehicle apparatus is provided to include (i) a multicore microcomputer having a plurality of cores and (ii) a parallel program parallelized from a plurality of processes in a single program for a single core microcomputer having one core for the multicore microcomputer. The parallel program is generated by: extracting an extracted address and an extracted symbol name, the extracted address being an address of an accessed data item, the accessed symbol name being a symbol name of the accessed data item, the accessed data item being among a plurality of data items that are stored in a storage area together with the plurality of processes and being accessed when each process is executed; associating an associated address with the extracted symbol name, the associated address being an address in the storage area that stores the accessed data item of the extracted symbol name; and analyzing a dependency between each process based on subject addresses that are the extracted address and the associated address to determine parallelizable processes from the plurality of processes, and determining that two processes accessing an identical address have a dependency while determining that two processes not accessing an identical address have no dependency. Herein, the parallel program allocates the plurality of processes to the plurality of cores respectively; and a subject core that is any one of the cores of the multicore microcomputer executes any process that is allocated to the subject core itself.

Similar to the first and second examples, the third example can create a parallel program while suppressing errors in the dependence analysis.

BRIEF DESCRIPTION OF THE DRAWINGS

The above and other objects, features, and advantages of the present disclosure will become more apparent from the following detailed description made with reference to the accompanying drawings. In the drawings.

DETAILED DESCRIPTION

Embodiment

An embodiment of the present disclosure is explained in reference to the drawings below. The present embodiment uses an example of generating a parallel program 21$a$1 from multiple processes MT0 to MT11 in a single program for a single core microcomputer having a single core. The parallel program 21$a$1 is parallelized for a multicore processor 21 having a first core 21$c$ and a second core 21$d$. The processes can be also called a process block and macro tasks. The processor can be also called a microcomputer. Therefore, the multicore processor can be also called a multicore microcomputer.

The parallel program 21$a$1 is generated for the multicore processor 21 becoming popular because of several disadvantages of a processor, such as increases in heat emission, increases in power consumption, limitation of the clock frequency. The multicore processor 21 is needed to be applicable to in-vehicle apparatuses. The parallel program 21$a$1 is needed to be reliable and executable at high speed while reducing development time and cost for software.

When the parallel program 21$a$1 is generated, the dependencies between multiple processes MT0 to MT11 in a single program is analyzed, and the multiple processes MT0 to MT11 are assigned to different cores 21$c$ and 21$d$ of the multicore processor 21. The "to assign" can be also called "to place," "to allocate," and "to allot" Each of the multiple processes MT0 to MT11 is assigned to the first core 21$c$ and second core 21$d$ while maintaining the dependencies between the multiple processes MT0 to MT11. For the assignment, reference is made to Patent Literature 1. The present embodiment uses a single program written in C language as an example. The present disclosure is not limited to the single program written in C language. The single program may be written in a programming language different from C.

Figure 7:
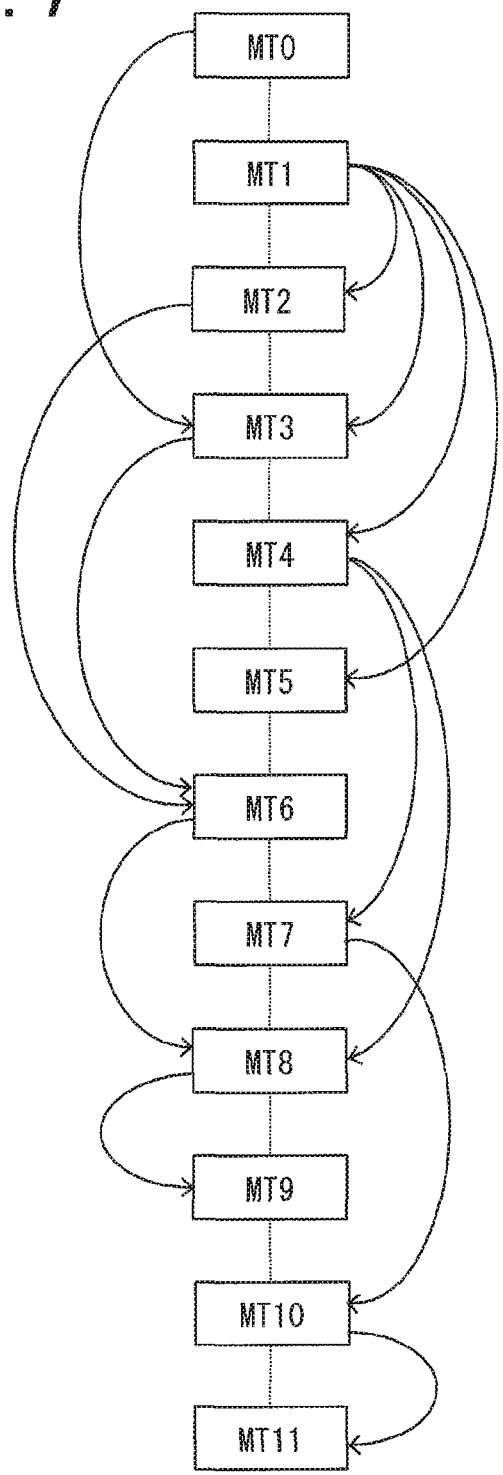
FIG. 7 is a diagram illustrating a single program in the embodiment.
Figure 8:
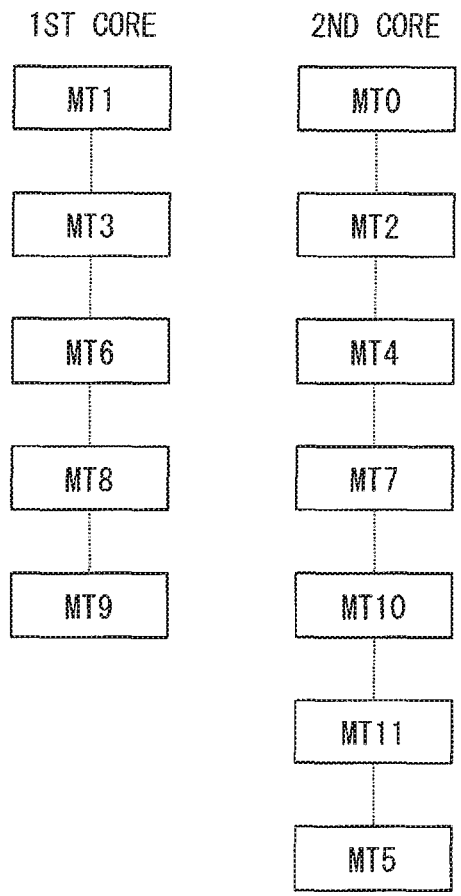
FIG. 8 is a diagram illustrating a parallel program in the embodiment.

As in FIG. 7, the present embodiment uses a single program having a first process MT0 to 12th process MT11 as an example. As in FIG. 8, the present embodiment assigns the first process MT0 to 12th process MT11 to the first core 21$c$ and second core 21$d$.

The processes MT0 to MT11 include the processes MT having dependencies. FIG. 7 illustrates the processes having dependencies by the arrows. In the present embodiment, the first process MT0 and fourth process MT3 have a dependency.

The dependency is a relationship in which a certain process references the data updated by a process executed before the certain process. That is, the multiple processes include a precedent process executed in a precedent order and a later process executed after execution of the precedence process in a single program. The later process is influenced by the precedent process to use the data whose content may be updated by the precedent process. Specifically, when each of (i) a precedent process and (ii) a later process only references data, their processing results do not change regardless of the processing order of the two processes. In this case, the two processes have no dependency. The dependency can also be called dependence.

Figure 1:
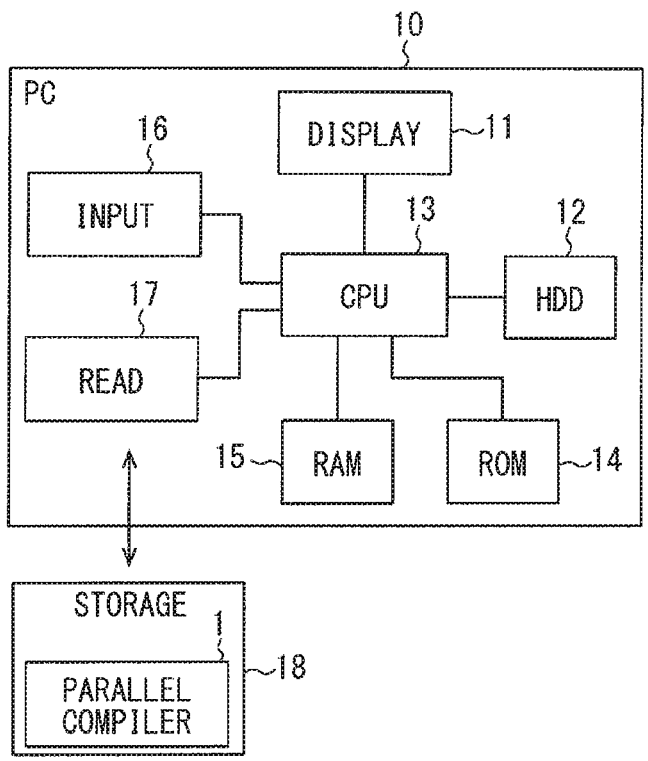
FIG. 1 is a block diagram illustrating a schematic configuration of a computer in an embodiment.

A configuration of a computer 10 is explained using FIG. 1. The computer 10 corresponds to a parallelization tool that executes a parallelization method to generate a parallel program 21$a$1. The computer 10 includes a display 11, HDD 12, CPU 13, ROM 14, RAM 15, input apparatus 16, and read portion 17. The HDD is the abbreviation for a hard disk drive. The CPU is the abbreviation for a central process unit. The ROM is the abbreviation for a read only memory. The RAM is the abbreviation for a random access memory.

The computer 10 can read contents stored in a storage medium 18. The storage medium 18 stores an automatic parallelization compiler 1. The automatic parallelization compiler 1 includes a procedure of generating a parallel program 21$a$1. The automatic parallelization compiler 1 therefore corresponds to a parallelization method. That is, the automatic parallelization compiler 1 is a program including the parallelization method. The computer 10 executes the automatic parallelization compiler 1 to generate a parallel program 21a1.

For the configurations of the computer 10 and storage medium 18, reference is made to a computer 100 and storage medium 180 in Patent Literature 1, the disclosure of which is incorporated by reference. The automatic parallelization compiler 1 includes an extraction procedure, and an association procedure in addition to the elements in Patent Literature 1. The extraction procedure and association procedure are explained later. The automatic parallelization compiler 1 is different from that in Patent Literature 1 in terms of contents of the dependency analysis.

Figure 3:
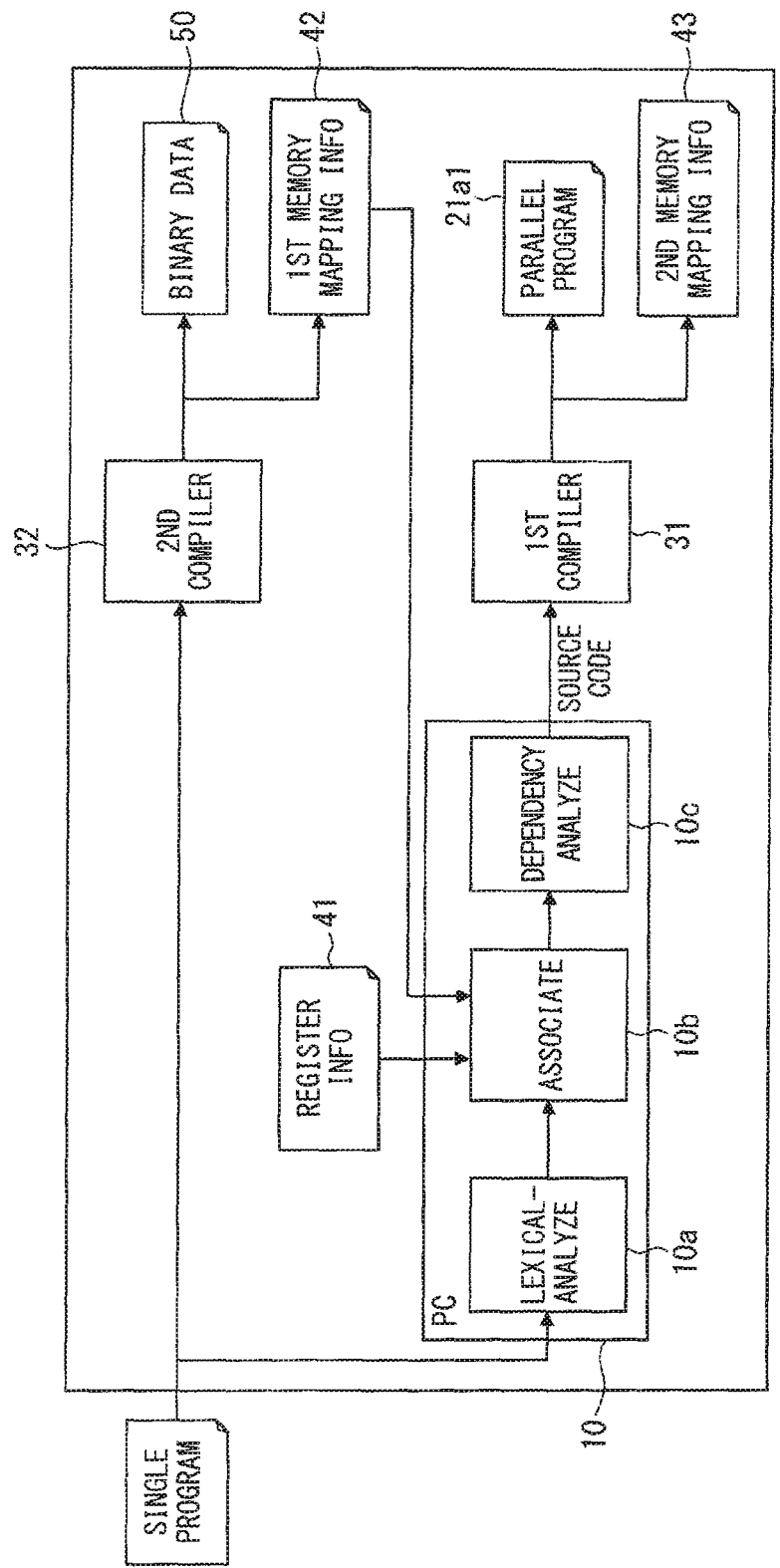
FIG. 3 is a block diagram illustrating functions of the computer in the embodiment.

The computer 10 includes a lexical-analysis section 10a, association section 10b, and dependency analysis section 10c as functional blocks as in FIG. 3. The computer 10 can acquire microcomputer register information 41 and first memory mapping information 42. The computer 10 generates the parallel program 21a1, which is a source code written in C language, from a single program, which is a source code written in C language. The processing of the computer 10 is explained in detail later. The computer 10 includes a well-known estimation section, core assignment section, and scheduling section (none-shown). The lexical-analysis section 10a is well known, and is not explained in detail.

Note that information may be used as being countable as well as uncountable. That is, information may be equivalent to an information item; informations may be equivalent to information items. Further, "data" may be singular or plural. To dearly indicate whether data is singular or plural, a data item may be used in the present application. In other words, a single data may be expressed as a (single) data item, whereas several data may be expressed as (several) data items.

The microcomputer register information 41 is information on a register 21e. The register 21e, explained later, includes an input port register and an output port register. That is, the register 21e defines the input port register and output port register. The microcomputer register information 41 includes addresses of the input port register and output port register in the register 21e. The addresses herein can also be called later-mentioned addresses in a memory space. The present embodiment uses, as symbol names, the definitions of the register 21e such as the input port register and output port register. The microcomputer register information 41 may be thus association information to associate symbol names and addresses in the memory space. The microcomputer register information 41 is used in the association section 10b.

The first memory-mapping information 42 is a result of the compile of the single program by a second compiler 32 and of memory mapping. The second compiler 32 includes a lexical-analysis section, a syntactical-meaning analysis section, and an assembler deployment section. The second compiler 32 compiles a single program written in C language into binary data 50 by use of assembly language to generate the first memory-mapping information 42.

The first memory-mapping information 42 is a result of temporary memory mapping of the source code of the single program, and includes memory-mapping information on variables. The first memory-mapping information 42 thus includes associations between variables and addresses of the area where the variables in the RAM 21b are defined.

The second memory-mapping information 43, different from the first memory-mapping information 42, is a result of memory mapping of the source code of the parallel program 21a1, and includes memory-mapping information on variables. The second memory-mapping information 43 can be used in the same way as the first memory-mapping information 42.

Variable names are defined in part of the memory space (RAM 21b) explained later. The present embodiment uses defined variable names as symbol names. Thus, the first memory-mapping information 42 associates the symbol names with addresses in the memory space. The first memory-mapping information 42 is used in the association section 10b.

The first compiler 31 includes a lexical-analysis section, syntactical-meaning analysis section, and assembler expansion section. The two compilers are the same except that the first compiler 31 compiles a source code after parallelization and the second compiler 32 compiles a source code before parallelization. The first compiler 31 compiles the parallel program 21a1 written in C into assembly language and then into binary data. That is, the parallel program 21a1 written in C is transformed by the first compiler 31 into the parallel program 21a1 written in a machine language such as binary data. The parallel program 21a1 formed of binary data, namely, performable in each core 21c, 21d is stored in a ROM 21a. The parallel program 21a1 before compiled by the first compiler 31 and the parallel program 21a1 stored in the ROM 21a are the same program except for only the specifications. The first compiler 31 generates the second memory-mapping information 43.

Assembly language includes mnemonics and operands. Mnemonics are instructions executed by an operation portion such as the first core 21c and second core 21d. An operand is the object of a mnemonic.

Mnemonics are described as ADD, LD, ST, AND, and NOR ADD is an instruction for addition. LD is an instruction for loading. ST is an instruction for store. AND is an instruction for logical product. NOP is an instruction for no operation. Mnemonics include not only these general-purpose instructions but also less versatile special instructions (hereinafter, special instructions). The special instructions are peculiar to a certain processor. Special instructions can be executed by a certain processor, but may not be executed by other processors.

The second compiler 32 has a configuration corresponding to the multicore processor 21. That is, the second compiler 32 is dedicated for the multicore processor 21. Therefore, the second compiler 32 can transform the single program to the assembly language including special instructions peculiar to the multicore processor 21. The second compiler 32 corresponds to a compiler for a microcomputer.

In the parallel program 21a1, two processes MT having a dependency may be arranged separately in the mutually different cores 21c and 21d. Therefore, when two processes MT having the dependency on each other are separately arranged in the core 21c and the core 21d, the parallel program 21a1 includes a synchronization operation to execute a later process MT after completion of a preceding process MT assigned to a different core. That is, the parallel program 21a1 includes the synchronization operation, when completing a previous process MT assigned to one core, to execute a next process MT assigned to the one core after completion of a different process MT assigned to the other core. The different process MT assigned to the other core herein has a dependency on the next process MT assigned to the one core, and is executed before the next process MT assigned to the first core.

Thus, when completing the processes MT assigned to themselves, the first core 21c and second core 21d access the RAM 21b and stores information about the wait for synchronization (hereinafter, completion information) in the RAM 21b to execute a synchronization operation. The one core that is waiting for the completion of the dependent process MT of the different core periodically accesses the RAM 21b to confirm whether the completion information is stored in the RAM 21b without executing the process MT. That is, the one core that is waiting for the completion of the dependent process MT of the different core periodically accesses the RAM 21b during non-operation to confirm whether the completion information is stored. Thus, the first core 21c and second core 21d wait one another, namely, are synchronized with one another, to execute the processes MT. Therefore, the synchronization process can be also called a wait process. Further, the parallel program 21a1 includes a program executed by the first core 21c and a program executed by the second core 21d.

Figure 2:
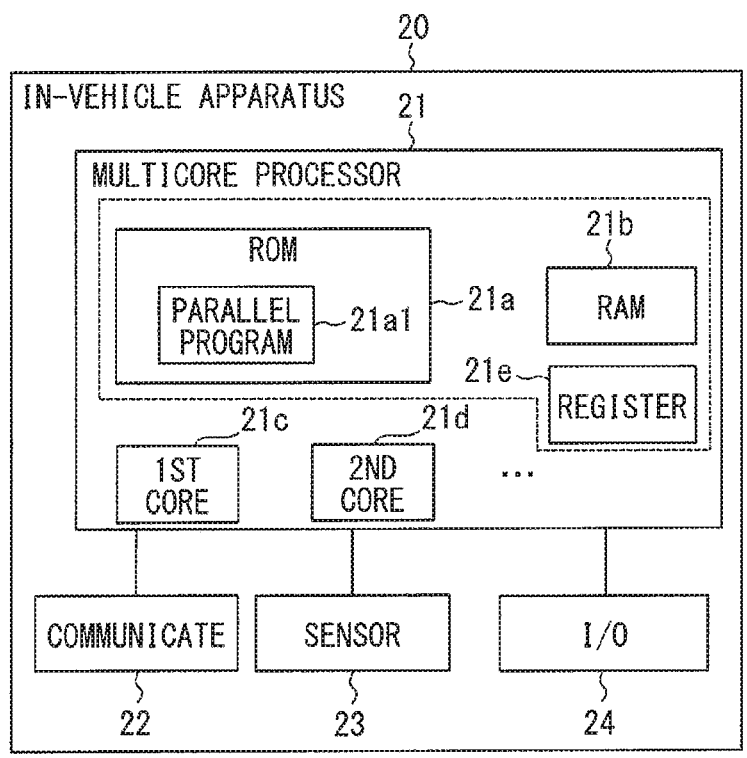
FIG. 2 is a block diagram illustrating schematic configuration of an in-vehicle apparatus in the embodiment.

A configuration of an in-vehicle apparatus 20 is explained. The in-vehicle apparatus 20 includes a multicore processor 21, a communication portion 22, a sensor portion 23, and an input-output port 24 as in FIG. 2. The multicore processor 21 includes the ROM 21a, RAM 21b, first core 21c, second core 21d, and register 21e. The in-vehicle apparatus 20 is applicable to an engine control apparatus and hybrid control apparatus mounted to a vehicle. One example herein uses the in-vehicle apparatus 20 applied to an engine control apparatus. In this case, the parallel program 21a1 can be called a vehicle control program for engine control. The parallel program 21a1 is not limited to the vehicle control program. The core can be also called a processor element.

The first core 21c and second core 21d execute the parallel program 21a1 to perform engine control. Specifically, the first core 21c and second core 21d execute the processes MT assigned from the parallel program 21a1 to the cores and execute wait processes to perform engine control. For the RAM 21b, communication portion 22, sensor portion 23, and input-output port 24, reference is made to a RAM 420, communication portion 430, sensor portion 450, and input-output port 460 in Patent Literature 1.

Figure 5:
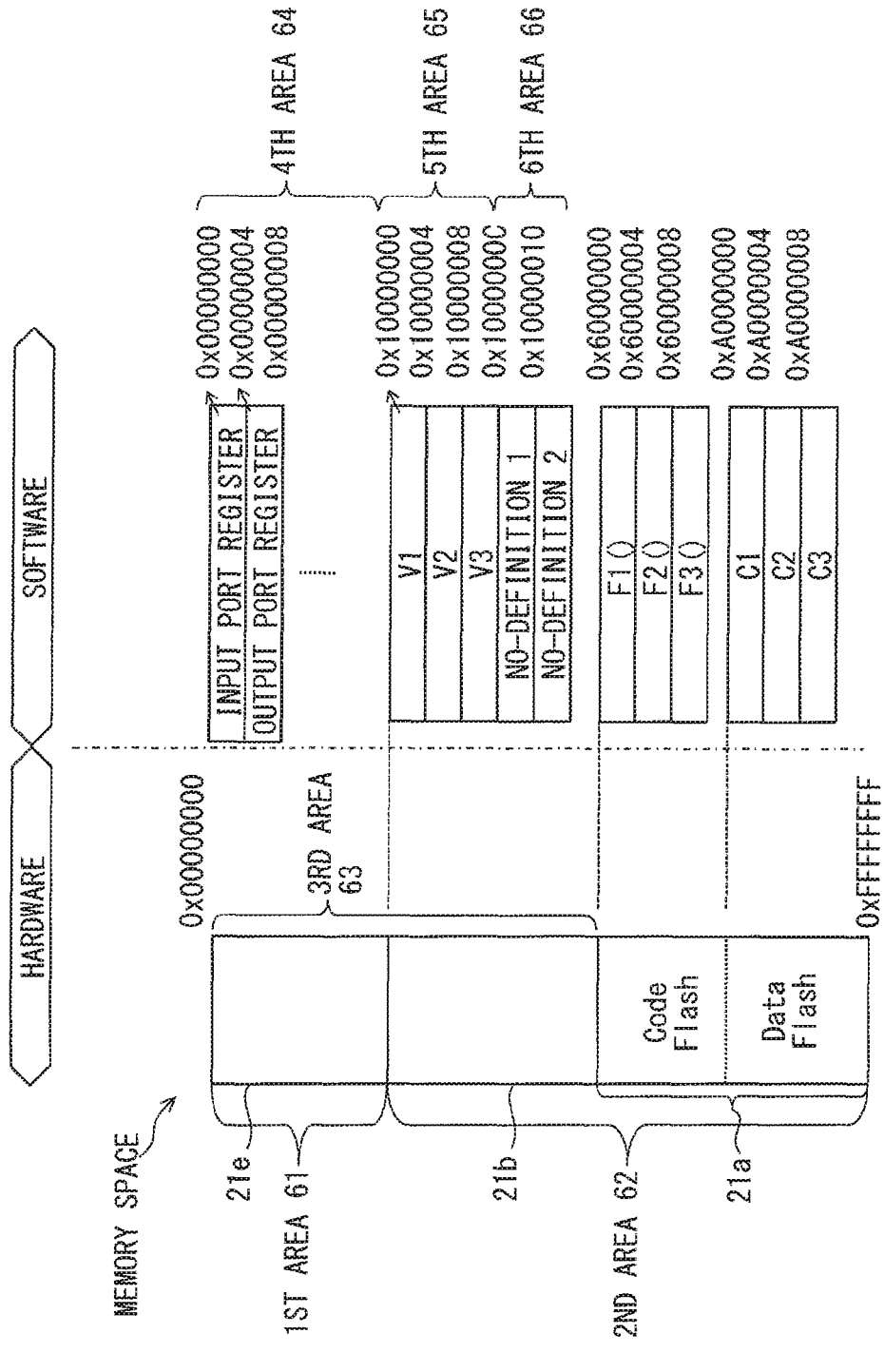
FIG. 5 is a diagram illustrating relationship between storage contents and addresses in a memory space in the embodiment.

The ROM 21a, RAM 21b, and register 21e form a memory space managed by a series of addresses (0x00000000 to 0xFFFFFFFF) as in FIG. 5. The memory space corresponds to a storage area. The ROM 21a includes a code flash and a data flash as in FIG. 5. The parallel program 21a1 generated by the computer 10 based on the automatic parallelization compiler 1 is written and stored in the ROM 21a. Specifically, the code flash stores functions F1( ), F2( ), and F3( ) of the parallel program 21a1. Function F1( ) is contained in each process MT. Therefore, the code flash stores each process MT. The data flash stores constants C1, C2, and C3. The parallel program 21a1 stored in the ROM 21a is written in machine language such as binary data as above.

The RAM 21b is partitioned into a fifth area 65 to define variable names in software and a sixth area 66 to define no variable name in software. The variable names herein include V1, V2, and V3. The example of data to define no variable name uses a no-definition 1 and no-definition 2. The variable names correspond to the above symbol names. The data of the sixth area 66 is accessible by an address direct value.

The register 21e includes an input port register and an output port register. The register 21e stores input values and output values as data. The register names (resource names) of the input port register and output port register correspond to the above symbol names. The register 21e can be called a fourth area 64. The register 21e in the fourth area 64 is operable by an address direct value.

An address of the memory space that stores each data is associated with each data of the fourth area 64 and fifth area 65 (association procedure, association section 10b, association processor). An address of the memory space that stores each data is associated with a symbol name of each data of the fourth area 64 and fifth area 65 (association procedure, association section 10b, association processor). The input port register is associated with 0x00000000. The output port register is associated with 0x00000004. The variable name V1 is associated with 0x10000000. Each data of the sixth area 66 is accessible by an address direct value. Therefore, each data may be associated with the address of the memory space that stores each data.

The memory space can be partitioned into a first area 61, second area 62, and third area 63. The first area 61 corresponds to the register 21e, and is not changed by software. The first area 61 can be also called a microcomputer reserved area. The second area 62 corresponds to the ROM 21a and RAM 21b, and is changed by software. The second area 62 can also be called a user area. The third area 63 corresponds to the RAM 21b and register 21e, and is rewritten when the microcomputer operates.

The arrangements of the data and program (code) in the memory space are different between the parallel program 21a1 and single program.

The arrangements of the data and program are explained separately. First, the arrangement of the data is explained. The above synchronization process is needed to process the same operations as the single program in multiple cores that operate asynchronously when there is a data dependency. The single program has no synchronization process. The synchronization process is added to the parallel program 21a1 through parallelization. Since progresses of the multiple cores 21c and 21d are shared in the synchronization process by data reading and writing, dedicated data is additionally defined. The arrangement of the data is therefore different before and after parallelization. When cores of the microcomputer increase, the configuration of the RAM that stores each data is usually changed. When the configuration of the RAM is changed, optimal data arrangement is also changed. Therefore, the data arrangement in the memory space is different before and after parallelization because of optimal data rearrangement.

Next, the program arrangement is explained. As above, the program additionally includes a synchronization process, and is thus arranged differently in the memory space before and after parallelization. Since the functions executed in the single program are assigned to each core 21c, 21d of the multicore processor 21, a calling order changes and part of the program changes. The arrangement of the program in the memory space is therefore different before and after parallelization.

Figure 4:
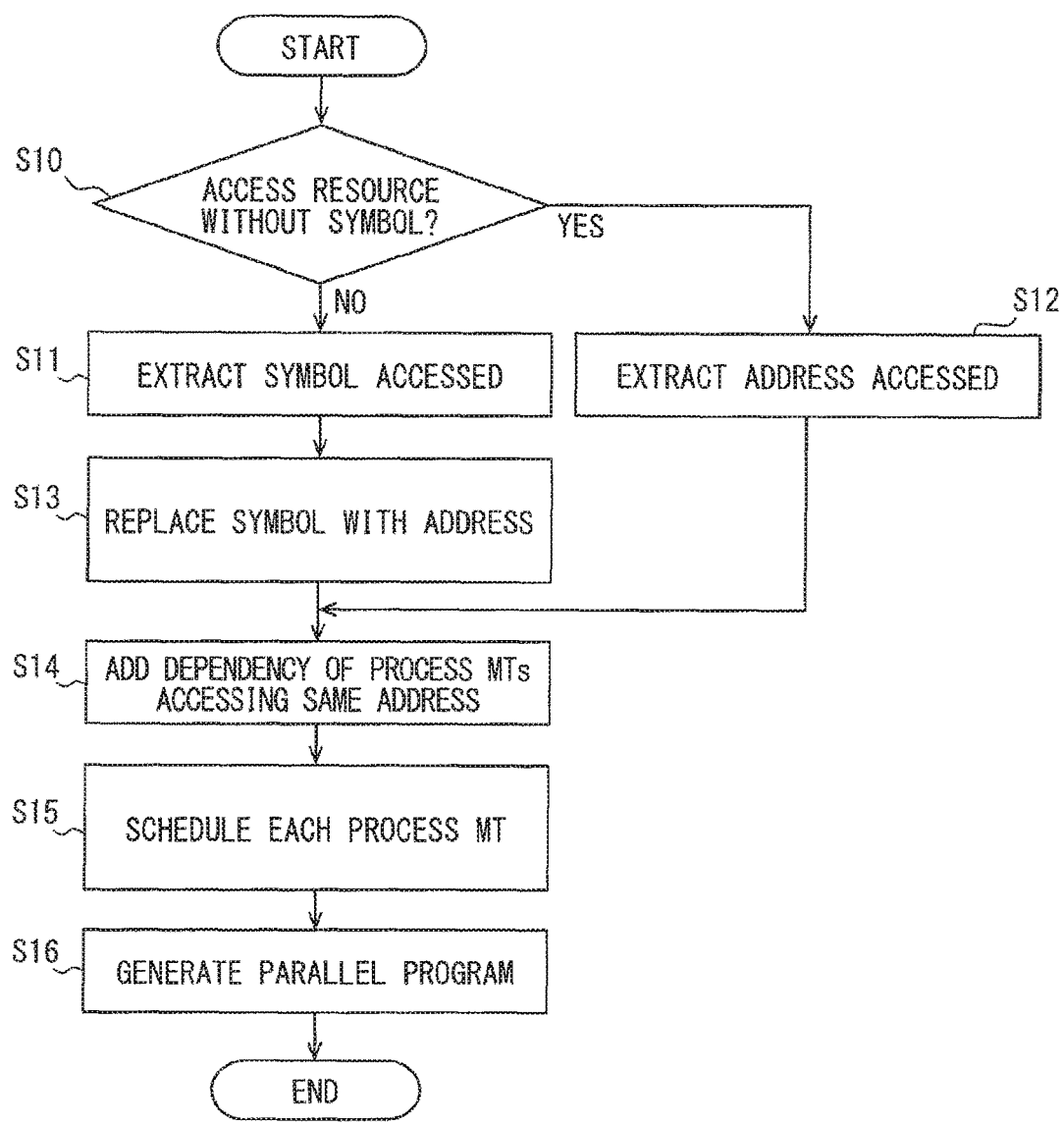
FIG. 4 is a flowchart illustrating processing of the computer in the embodiment.

Next, the processing when the computer 10 executes the automatic parallelization compiler 1 is explained using FIG. 4. The computer 10 generates the parallel program 21a1 by executing the automatic parallelization compiler 1.

It is noted that a flowchart or the processing of the flowchart in the present application includes sections (also referred to as steps), each of which is represented, for instance, as S10. Further, each section may correspond to a procedure in the automatic parallelization compiler 1. Moreover, each section can be divided into several sub-sections while several sections can be combined into a single section. Each of thus configured sections can be also referred to as a device, module, or processor. Furthermore, such a section along with a structural modifier may be also referred as another name; for instance, a dependency analysis section may be also referred to as a dependency analyzer. Each or any combination of sections explained in the above can be achieved as (i) a software section in combination with a hardware unit (e.g., computer) or (ii) a hardware section, including or not including a function of a related apparatus; furthermore, the hardware section may be constructed inside of a microcomputer.

At S10, it is determined whether to access a resource having no symbol name (i.e., whether to access a resource without symbol name). The computer 10 determines whether to access a resource having no symbol name from whether each of the multiple processes MT0 to MT11 specifies an access to the data in the fourth area 64 and fifth area 65 or to the data in the sixth area 66. That is, the computer 10 determines whether each of multiple processes MT0 to MT11 is executed to access the data in the fourth area 64 and fifth area 65 or the data in the sixth area 66.

The computer 10 determines that the process MT that specifies an access to the data in the fourth area 64 and fifth area 65 does not access a resource having no symbol name (NO), and proceeds to S11. The computer 10 determines that the process MT that specifies an access to the data in the sixth area 66 accesses a resource having no symbol name (YES), and proceeds to S12. S10 is executed in the association section 10b.

Hereinafter, specification of data to be accessed using a symbol name may be called just symbol specification, and specification of data to be accessed using an address may be called just address specification.

At S11, a symbol name to be accessed by each process MT is extracted (symbol extraction section, symbol extractor, or symbol extraction procedure). That is, the computer 10 extracts the symbol name to be accessed by each process MT determined to use symbol specification within the multiple processes MT0 to MT11. At S12, an address to be accessed by each process MT is extracted (address extraction section, address extractor, or address extraction procedure). Here, combination of S11 and S12 may be also referred to as a symbol and address extraction section, symbol and address extractor, or symbol and address extraction procedure. That is, the computer 10 extracts the address to be accessed by each process MT determined to use address specification within the multiple processes MT0 to MT11. S11 and S12 are executed in the association section 10b. Thus, the computer 10 extracts addresses and symbol names of multiple data that are stored in the memory space together with the multiple processes MT0 to MT11 and that are accessed when each process MT0 to MT11 is executed.

At S13, the symbol names are replaced by addresses based on the extracted symbol names and an access list. That is, the computer 10 associates the extracted symbol names with the addresses of the memory space that stores the data of the extracted symbol names (symbol association section, symbol association processor, or symbol association procedure). The computer 10 associates the symbol names with the addresses by using the microcomputer register information 41 and first memory-mapping information 42. The extracted symbol names are thereby associated with the addresses in the memory space.

This analyzes dependencies with respect to the processes MT using symbol specification and the processes MT using address specification. That is, S13 analyzes the dependencies between the processes MT using symbol specification, between the processes MT using address specification, and between the processes MT using symbol specification and the processes MT using address specification.

Therefore, the addresses used to analyze the dependencies include the addresses in the register 21e of the memory space. The addresses used to analyze the dependencies include the addresses in the result of the compile of the single program and address mapping of each data.

Thus, the computer 10 executes S11 to extract the symbol names in the fourth area 64 and fifth area 65 as in FIG. 5. Specifically, the computer 10 extracts the input port register, output port register, and variables V1 to V3 as symbol names. The computer 10 executes S13 to associate the input port register with an address 0x00000000 as in FIG. 5. Similarly, the computer 10 associates the output port register with an address 0x00000004, the variable V1 with an address 0x10000000, the variable V2 with an address 0x10000004, and the variable V3 with an address 0x10000008.

The computer 10 executes S12 to extract 0x1000000C as an address of the no-definition 1 in the sixth area 66 and 0x10000010 as an address of the no-definition 2 in the sixth area 66 as in FIG. 5.

S13 is executed in the association section 10b. The present embodiment may include at least either the addresses in the register 21e or the addresses in the result of the address mapping.

At S14, a dependency is added between the processes MT that access the same address. The computer 10 analyzes dependencies between each process based on extracted addresses and associated addresses to determine parallelizable processes from the multiple processes MT, and determines that two processes MT that access the same address (i.e., identical address) have a dependency. The computer 10 determines that two processes MT that access different addresses have no dependency (dependency analysis section, dependency analyzer, dependency analysis procedure). S14 is executed in the dependency analysis section 10c. The dependency analysis section 10c corresponds to an analysis section.

At S15, each process MT is scheduled based on the acquired dependencies (task scheduling section, task scheduler). At S16, the parallel program 21a1 is generated based on the scheduling result (core assignment section, core assigner).

Figure 6:
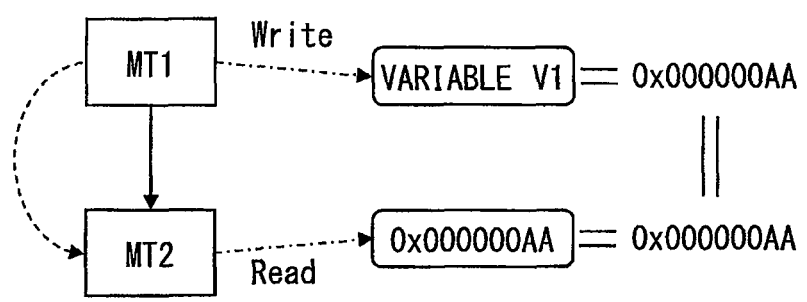
FIG. 6 is a diagram illustrating a specification of data of each process in the embodiment.
Figure 9:
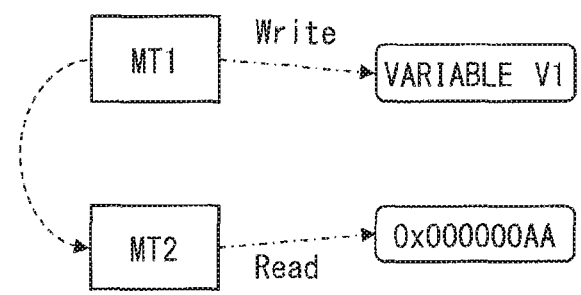
FIG. 9 is a diagram illustrating a specification of data of each process in a comparative example.

An advantageous effect of the present disclosure is explained in reference to FIG. 6 and a comparative example in FIG. 9. The comparative example does not execute the process that associates symbol names and addresses. The second process MT1 using symbol specification and the third process MT2 using address specification are used herein. The second process MT1 specifies the variable V1, which is a symbol name, when executed. The process MT2 specifies an address 0x000000AA when executed. The data of the variable V1 has the address 0x000000AA.

In the comparative example, the second process MT1 specifies the variable V1 and the third process MT2 specifies the address 0x000000AA. It is therefore difficult to determine whether the variable V1 and 0x000000AA indicate the same data. In the comparative example, the dependency between the second process MT1 and third process MT2 is unanalyzable.

The computer 10 associates the variable V1 with the address 0x000000AA as in FIG. 6. The computer 10 can therefore acquire the address of the data specified by the second process MT1. The computer 10 compares the address corresponding to the symbol name specified by the second process MT1 with the address specified by the third process MT2 to determine whether the second process MT1 and third process MT2 specify the same data. Thus, the computer 10 can analyze the dependency between the second process MT1 and third process MT2. In this example, the computer 10 determines that the second process MT1 and third process MT2 specify the data of the address 0x000000AA, namely, specify the access to the same data, and have a dependency.

As above, the computer 10 extracts, within multiple data accessed when each process MT0 to MT11 is executed, an address of the data accessed in the memory space when each process MT0 to MT11 is executed. The computer 10 extracts, within multiple data accessed when each process MT0 to MT11 is executed, a symbol of the data accessed in the memory space when each process MT0 to MT11 is executed. That is, the computer 10 extracts an address when each process MT0 to MT11 specifies the address, and extracts a symbol name when each process MT0 to MT11 specifies the symbol name. The present disclosure associates the extracted symbol name with the address of the memory space corresponding to the symbol name. The address of memory space is thus associated with the data whose symbol name is specified to be accessed when each process MT0 to MT11 is executed.

The computer 10 analyzes dependencies between each process MT0 to MT11 based on the addresses of data specified in each process. The computer 10 analyzes that (at least) two processes that access the same data have a dependency and (at least) two processes that do not access the same data have no dependency. The computer 10 can thus analyze the dependencies between each process MT0 to MT11 based on the addresses. Thus, the computer 10 can create a parallel program while suppressing errors in the dependency analysis.

The computer 10 can analyze dependencies for both the processes MT using address specification and the processes MT using symbol specification. That is, the computer 10 can analyze dependencies between the processes MT using address specification, between the processes MT using symbol specification, and between the process MT using address specification and the process MT using symbol specification. Thus, the computer 10 can analyze more dependencies between the processes MT than those between only the processes using symbol specification or only the processes symbol specification. Thus, the computer 10 can parallelize more processes MT than those when parallelizing only the processes MT using address specification in the single program or only the processes MT using symbol specification.

The computer 10 executes the automatic parallelization compiler 1 to generate the parallel program 21a1. The automatic parallelization compiler 1 can obtain the same advantageous effect as the above computer 10.

The in-vehicle apparatus 20 executes the parallel program 21a1 generated while suppressing errors in the dependency analysis to execute each process MT0 to MT11 optimally. The in-vehicle apparatus 20 executes the parallel program 21a1 in which many processes MT in the single program are parallelized to efficiently operate the first core 21c and second core 21d.

The present embodiment uses the in-vehicle apparatus 20 having the first core 21c and second core 21d. The present disclosure is however not limited to the present embodiment, but applicable to even an in-vehicle apparatus having three or more cores. The present disclosure can therefore use a computer and automatic parallelization compiler to generate a parallel program applicable to three or more cores from a single program. The parallel program 21a1 may be executed in a different apparatus from the in-vehicle apparatus 20.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A parallelization method comprising:
   determining, in response to starting to generate a parallel program, whether an accessed data item is a first data item that has a symbol name or a second data item that does not have a symbol name,
      the accessed data item being among a plurality of data items that are stored in a storage area together with a plurality of processes, the first data item and the second data item being included to be simultaneously coexisting in the plurality of data items,
      the accessed data item being accessed when each process among the plurality of processes is executed,
      the plurality of processes being in a single program for a single core microcomputer having one core;
   in response to the accessed data item being determined to be the second data item, (i) extracting an extracted address, the extracted address being an address location, in the storage area, at which the second data item is stored;
   in response to the accessed data item being determined to be the first data item,
      (i) extracting, as an extracted symbol name, the symbol name of the first data item; and
      (ii) associating an associated address with the extracted symbol name by replacing the extracted symbol name with the associated address, the associated address being an address location, in the storage area, at which the first data item is stored;
   performing an analysis procedure including
      analyzing a dependency between, of the plurality of processes, a first process and a second process, to determine parallelizable processes from the plurality of processes, by determining whether or not a first address in the storage area accessed by the first process is identical to a second address in the storage area accessed by the second process,
         the first address being either the extracted address or the associated address, the second address being either the extracted address or the associated address,
      determining that the first process and the second process have the dependency in response to the first address being identical to the second address, and
      determining that the first process and the second process fail to have the dependency in response to the first address failing to be identical to the second address;
   scheduling each of the plurality of processes based on results of determining the dependency; and
   generating the parallel program parallelized for a multi-core microcomputer having a plurality of cores based on results of the scheduling,
   wherein:

the parallel program allocates the plurality of processes to the plurality of cores respectively; and a subject core that is any one of the cores of the multicore microcomputer executes any process that is allocated to the subject core itself.

2. The parallelization method according to claim 1, wherein
either the extracted address or the associated address upon which the dependency is analyzed includes an address in a register of the storage area.

3. The parallelization method according to claim 1, wherein
either the extracted address or the associated address upon which the dependency is analyzed includes an address in a result of compile of the single program and address mapping of each data item.

4. The parallelization method according to claim 1, wherein
the plurality of processes are a plurality of macro tasks.

5. The parallelization method according to claim 1, wherein
the storage area is provided as a memory space.

6. The parallelization method according to claim 1, wherein
the extracted address and the extracted symbol name are extracted from the plurality of data items that are stored in the storage area.

7. A parallelization tool comprising:
a processor and a memory, the processor executes instructions in the memory to
determine, in response to starting to generate a parallel program, whether an accessed data item is a first data item that has a symbol name or a second data item that does not have a symbol name,
the accessed data item being among a plurality of data items that are stored in a storage area together with a plurality of processes, the first data item and the second data item being included to be simultaneously coexisting in the plurality of data items,
the accessed data item being accessed when each process among the plurality of processes is executed,
the plurality of processes being in a single program for a single core microcomputer having one core;
in response to the accessed data item being determined to be the second data item, (i) extract an extracted address, the extracted address being an address location, in the storage area, at which the second data item is stored; and
in response to the accessed data item being determined to be the first data item,
(i) extract, as an extracted symbol name, the symbol name of the first data item; and
(ii) associate an associated address with the extracted symbol name by replacing the extracted symbol name with the associated address, the associated address being an address location, in the storage area, at which the first data item is stored;
perform an analysis procedure including to
analyze a dependency between, of the plurality of processes, a first process and a second process, to determine parallelizable processes from the plurality of processes, by determining whether or not a first address in the storage area accessed by the first process is identical to a second address in the storage area accessed by the second process,
the first address being either the extracted address or the associated address, the second address being either the extracted address or the associated address,
determine that the first process and the second process have the dependency in response to the first address being identical to the second address, and
determine that the first process and the second process fail to have the dependency in response to the first address failing to be identical to the second address;
schedule each of the plurality of processes based on results of determining the dependency; and
generate the parallel program parallelized for a multicore microcomputer having a plurality of cores based on results of scheduling the plurality of processes,
wherein
the parallel program allocates the plurality of processes to the plurality of cores respectively; and
a subject core that is any one of the cores of the multicore microcomputer executes any process that is allocated to the subject core itself.

8. The parallelization tool according to claim 7, wherein
either the extracted address or the associated address upon which the dependency is analyzed includes an address in a register of the storage area.

9. The parallelization tool according to claim 7, wherein
either the extracted address or the associated address upon which the dependency is analyzed includes an address in a result of compile of the single program and address mapping of each data item.

10. The parallelization tool according to claim 7, wherein
the plurality of processes are a plurality of macro tasks.

11. The parallelization tool according to claim 7, wherein
the storage area is provided as a memory space.

12. The parallelization tool according to claim 7, wherein
the extracted address and the extracted symbol name are extracted from the plurality of data items that are stored in the storage area.

13. An in-vehicle apparatus comprising:
a multicore microcomputer; and
a parallel program, the parallel program being generated by a processor and a memory storing instructions, the processor executes instructions in the memory to:
determine, in response to starting to generate the parallel program, whether an accessed data item is a first data item that has a symbol name or a second data item that does not have a symbol name,
the accessed data item being among a plurality of data items that are stored in a storage area together with a plurality of processes, the first data item and the second data item being included to be simultaneously coexisting in the plurality of data items,
the accessed data item being accessed when each process among the plurality of processes is executed,
the plurality of processes being in a single program for a single core microcomputer having one core;
in response to the accessed data item being determined to be the second data item, (i) extract an extracted address, the extracted address being an address location, in the storage area, at which the second data item is stored;
in response to the accessed data item being determined to be the first data item,
(i) extract, as an extracted symbol name, the symbol name of the first data item; and (ii) associate an associated address with the extracted symbol name by replacing the extracted symbol name with the associated address, the associated address being an address location, in the storage area, at which the first data item is stored;

perform an analysis processing including to
analyze a dependency between, of the plurality of processes, a first process and a second process, to determine parallelizable processes from the plurality of processes, by determining whether or not a first address in the storage area accessed by the first process is identical to a second address in the storage area accessed by the second process,
the first address being either the extracted address or the associated address, the second address being either the extracted address or the associated address,
determine that the first process and the second process have the dependency in response to the first address being identical to the second address, and
determine that the first process and the second process fail to have the dependency in response to the first address failing to be identical to the second address;

schedule each of the plurality of processes based on results of determining the dependency; and generate the parallel program parallelized for the multicore microcomputer having a plurality of cores based on results of scheduling the plurality of processes, wherein:
the parallel program allocates the plurality of processes to the plurality of cores respectively; and
a subject core that is any one of the cores of the multicore microcomputer executes any process that is allocated to the subject core itself.

14. The in-vehicle apparatus according to claim 13, wherein
either the extracted address or the associated address upon which the dependency is analyzed includes an address in a register of the storage area.

15. The in-vehicle apparatus according to claim 13, wherein
either the extracted address or the associated address upon which the dependency is analyzed includes an address in a result of compile of the single program and address mapping of each data item.

16. The in-vehicle apparatus according to claim 13, wherein
the plurality of processes are a plurality of macro tasks.

17. The in-vehicle apparatus according to claim 13, wherein
the storage area is provided as a memory space.

18. The in-vehicle apparatus according to claim 13, wherein
the extracted address and the extracted symbol name are extracted from the plurality of data items that are stored in the storage area.

* * * * *